US007994695B2

(12) United States Patent
Collins et al.

(10) Patent No.: US 7,994,695 B2
(45) Date of Patent: Aug. 9, 2011

(54) LUMINESCENT MATERIALS FOR A CARBON NANOTUBE (CNT) FIELD EMISSION DEVICE (FED)

(75) Inventors: Brian Thomas Collins, Lititz, PA (US); Peter Michael Ritt, East Petersburg, PA (US); David Paul Ciampa, Lancaster, PA (US); James Kleppinger, Lancaster, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 111 days.

(21) Appl. No.: 12/308,679

(22) PCT Filed: Jun. 23, 2006

(86) PCT No.: PCT/US2006/024812
§ 371 (c)(1),
(2), (4) Date: Dec. 19, 2008

(87) PCT Pub. No.: WO2008/002288
PCT Pub. Date: Jan. 3, 2008

(65) Prior Publication Data
US 2010/0164366 A1 Jul. 1, 2010

(51) Int. Cl.
*H01J 29/10* (2006.01)
(52) U.S. Cl. .................. 313/461; 313/463; 313/473
(58) Field of Classification Search .................. 313/461, 313/463, 473
See application file for complete search history.

(56) References Cited

U.S. PATENT DOCUMENTS

| 2,785,331 | A | * | 3/1957 | Donahue ........................ 313/472 |
| 4,204,136 | A | * | 5/1980 | Phillips ........................ 313/473 |
| 5,906,771 | A | | 5/1999 | Watkins et al. |
| 6,005,342 | A | | 12/1999 | Morton |
| 6,379,583 | B1 | | 4/2002 | Gray et al. |
| 6,875,372 | B1 | | 4/2005 | Hampden-Smith et al. |
| 6,882,099 | B2 | | 4/2005 | Yamaguchi |
| 2001/0008363 | A1 | | 7/2001 | Sanghera et al. |
| 2003/0102797 | A1 | | 6/2003 | Kajiwara |
| 2005/0012447 | A1 | | 1/2005 | Komatsu et al. |
| 2008/0265743 | A1 | | 10/2008 | Yokosawa et al. |

FOREIGN PATENT DOCUMENTS
CN 1422320 6/2003
(Continued)

OTHER PUBLICATIONS

Yoo et al., "The Effects of Particle Size and Surface Recombination Rate on the Brightness of Low-Voltage Phosphors for Field Emission Display Application." Proceedings of 15th International Display Research Conference, Oct. 16-18, 1995,pp. 647-650, published: Tokyo, Japan and Santa Ana, CA, USA, Inst. Telev. Eng.

(Continued)

*Primary Examiner* — Vip Patel
(74) *Attorney, Agent, or Firm* — Robert D. Shedd; Harvey D. Fried; Patricia A. Verlangieri

(57) ABSTRACT

A RGB phosphor system for a carbon nanotube (CNT)/field emission device (FED) display operated between about 4-10 kV. The RGB phosphor system is formed on an interior surface of a screen of the CNT/FED display. The RGB phosphor system includes ZnS:Cu, Al (green phosphor), ZnS:Ag,Cl (blue phosphor) and $Y_2O_2S:Eu^{+3}$ (red phosphor). The average particle size for each of the green, blue and red phosphors should be about 3-4 microns.

10 Claims, 4 Drawing Sheets

FOREIGN PATENT DOCUMENTS

| | | |
|---|---|---|
| EP | 1273645 | 1/2003 |
| EP | 1555306 | 7/2005 |
| JP | 05251023 | 9/1993 |
| JP | 2004055385 | 2/2004 |
| WO | WO00/12649 | 3/2000 |
| WO | WO2005080528 | 1/2005 |

OTHER PUBLICATIONS

Dinsmore et al., "Mn-Doped znS Nanoparticles as Efficient Low-Voltage Cathodoluminescent Phosphors," Applied Physics Letters, vol. 75, No. 6, pp. 802-804, Aug. 9, 1999, AIP, USA.

Goldburt et al., "Doped Nanocrystalline Phosphors for Low Voltage Displays," IVMC'96, 9th International Vacuum Microelectronics Conference, Jul. 7-12, 1996, Technical Digest. (Cat. No. 96TH8212), pp. 637, published: IEEE, New York, NY, USA, 1996, USA.

Jeon et al., "Characterization of Low-Voltage Phosphor Screens for FED Applications," Flat Panel Display Materials II Symposium, Apr. 8-12, 1996 pp. 421-424, published: Pittsburgh, PA, USA, 1997, Mater. Res. Soc., USA.

Ko et al., "Low-voltage Cathodoluminescence Property of Li-Doped Gd2-xYx03:Eu3+," Journal of Luminescence, vol. 104, No. 3, pp. 215-221, Jul. 2003, Elsevier, Netherlands.

Kottaisamy et al., "Synthesis of Fine Particle Phosphors for Field Emission Displays," Bulletin of the Research Institute of Electronics, Shizuoka University, vol. 34, pp. 51-57, 1999, Japan.

Lee et al., "Characterization of Eu-Doped Y2O3 Nanoparticles Prepared in Nonionic Reverse Microemulsions in Relation to Their Application for Field Emission Display", Journal of the Electrochemical Society, vol. 147, No. 8, pp. 3139-3142, Aug. 2000, Electrochem. Soc, USA.

Park et al., "Morphology and Cathodoluminescence of Li-Doped Gd2O3:Eu3+, a Red Phosphor Operating at Low Voltages," Applied Physics Letters, vol. 77, No. 14, pp. 2162-2164, Oct. 2, 2000, AIP, USA.

Ravichandran et al, "Fabrication of Y3Al5O12:Eu Thin Films and Powders for Field Emission Display Applicatioins," Journal of Luminescence, vol. 71, No. 4, pp. 291-297, May 26, 1997, Elsevier, Netherlands.

Shea et al., "Phosphor Synthesis Routes and Their Effect on the Performance of Garnet Phosphors at Low-Voltages," Flat Panel Display Materials II Symposium, Apr. 8-12, 1996, pp. 409-414, published: Pittsburgh, PA, USA, 1997, Mater. Res. Soc, USA.

Silver et al., "A Novel Synthesis of Y2O3: Eu Phosphor Using Carbon Dioxide and Ammonia for High Definition CRT and FED Applications." 2002 SID International Symposium, May 21-23, 2002, Digest of Techincal Papers, vol. 33, Pt. vol. 1, pp. 12-15, San Jose, CA, USA, Soc. Inf. Display.

Vecht et al., "Engineering Phosphors for Field Emission Displays," Journal of Vacuum Science and Technology B (Microelectronics and Nanometer Structures), vol. 17, No. 2, pp. 750-757, Mar. 1999, AIP for America Vacuum Soc., USA.

International Search Report, dated Jul. 17, 2008.

Souriau J-C et al: Cathodoluminescent properties of coated SrGa2S4:Eu<2+> and ZnS: Ag, Cl phosphors for field emission display applications Material Science and Engineering B, Elsevier Sequoia, Lausanne, CH LNKD-DOI: 10.1016/S0921-5107 (00) 00445-1, vol. 76, No. 2, Jul. 1, 2000, pp. 165-168, XP004205041 ISSN: 0921-5107.

\* cited by examiner

LUMINESCENT MATERIALS FOR A CARBON NANOTUBE (CNT) FIELD EMISSION DEVICE (FED)

This application claims the benefit, under 35 U.S.C. §365 of International Application PCT/US2006/024812, filed Jun. 23, 2006 which was published in accordance with PCT Article 21(2) on Jan. 3, 2008 in English.

BACKGROUND OF THE INVENTION

1. Field of the Invention

The invention relates to a carbon nanotube(CNT)/field emission device (FED) displays and, more particularly to luminescent materials therefor.

2. Description of the Background Art

Carbon nanotube(CNT)/field emission device (FED) displays typically include a cathode with CNT emitters thereon, a metal gate, insulating spacers and a phosphor screen. The metal gate is interposed between the cathode and the phosphor screen. The phosphor screen is located on an inner surface of a faceplate of the display. The metal gate functions to direct electron beams generated from the CNT emitters toward appropriate color-emitting phosphors on the screen of the display.

The screen may be a luminescent screen. Luminescent screens typically comprise an array of three different color-emitting phosphors (e.g., green, blue and red) formed thereon. Each of the color-emitting phosphors is separated from another by a matrix line. The matrix lines are typically formed of a light-absorbing black, inert material.

In order to achieve displays with good color bightness and color gamut levels, CNT/FEDs should be operated between about 4-10 kV. CNT/FED displays operating below 4 kV are not competitive from a brightness standpoint and suffer additional degradation from electron stimulated surface reactions of the color-emitting phosphors.

Thus, a need exists for a phosphor system for a CNT/FED display with good color bightness and color gamut levels when operated between about 4-10 kV.

SUMMARY OF THE INVENTION

The present invention relates to a RGB phosphor system for a carbon nanotube (CNT)/field emission device (FED) display operated between about 4-10 kV. The RGB phosphor system is formed on an interior surface of a screen of the CNT/FED display. The RGB phosphor system includes ZnS:Cu, Al (green phosphor), ZnS:Ag,Cl (blue phosphor) and $Y_2O_2S:Eu^{+3}$ (red phosphor). The average particle size for each of the green, blue and red phosphors should be about 3-4 microns.

BRIEF DESCRIPTION OF THE DRAWINGS

The invention will now be described in greater detail, with relation to the accompanying drawings, in which.

DETAILED DESCRIPTION

Figure 1:
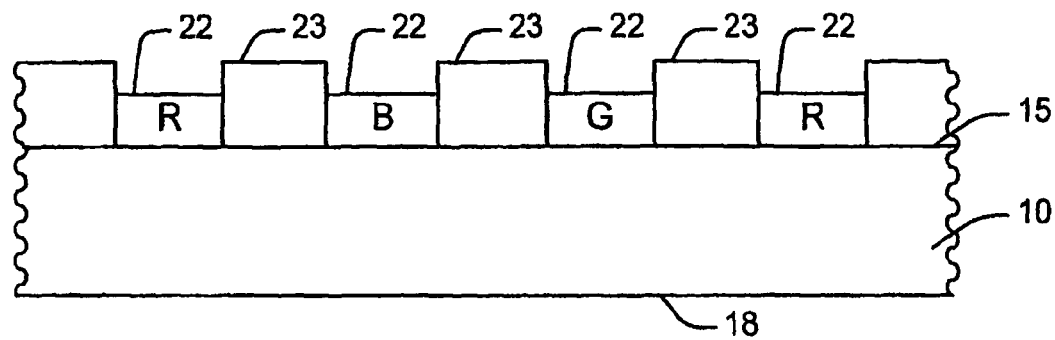
FIG. 1 is a section of screen of a CNT/FED display, showing a luminescent screen assembly.

The screen 10 of a CNT/FED display comprises a viewing surface 18 and an interior surface 15, shown in cross-section in FIG. 1. A three-color luminescent phosphor system 22 is applied to the interior surface of the screen 10. The screen 10 includes a multiplicity of screen elements comprised of red-emitting, green-emitting and blue-emitting phosphor pixels R, G and B, respectively, arranged in triads, each triad including a phosphor pad of each of the three colors. The R, G and B phosphor pads extend in a direction that is generally normal to the plane in which the electron beams are generated. A light-absorbing matrix 23, shown in FIG. 1, separates each of the phosphor pads from one another.

The RGB phosphor system is formed on an interior surface of the screen 10 of the CNT/FED display. The RGB phosphor system includes ZnS:Cu, Al (green phosphor), ZnS:Ag,Cl (blue phosphor) and $Y_2O_2S:Eu^{+3}$ (red phosphor). This RGB phosphor system is suitable for a carbon nanotube (CNT)/field emission device (FED) display operated between about 4-10 kV.

The average particle size for each of the green, blue and red phosphors should be about 3-4 microns. Such a particle size is suited for filling the phosphor openings in the light absorbing matrix 23 with minimum overlap and good packing density for planarizing layers. Phosphors in this size range have efficiencies of >95% of standard cathode ray tube (CRT) materials with particle sizes of between 6-9 microns. RGB phosphor systems with average particle sizes below 3 microns display decreased efficiency.

Figure 2:
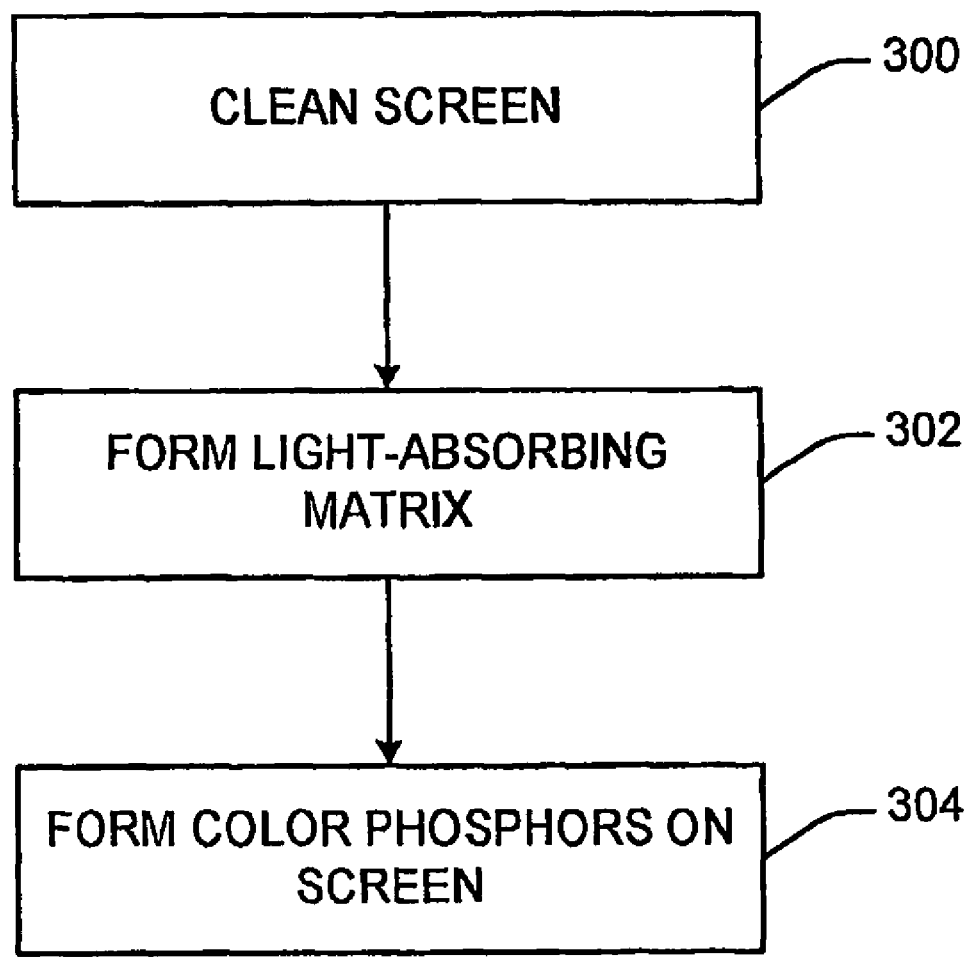
FIG. 2 is a block diagram comprising a flow chart of the manufacturing process for the screen assembly of FIG. 1.

The screen 10 is manufactured according to the process steps represented schematically in FIG. 2. Initially, the screen 10 is cleaned, as indicated by reference numeral 300, by washing it with a caustic solution, rinsing it in water, etching it with buffered hydrofluoric acid and rinsing it again with water, as is known in the art.

The interior surface 15 of the screen 10 is then provided with the light-absorbing matrix 23, as indicated by reference numeral 302, preferably using a wet matrix process in a manner well known in the art.

Figure 3A:
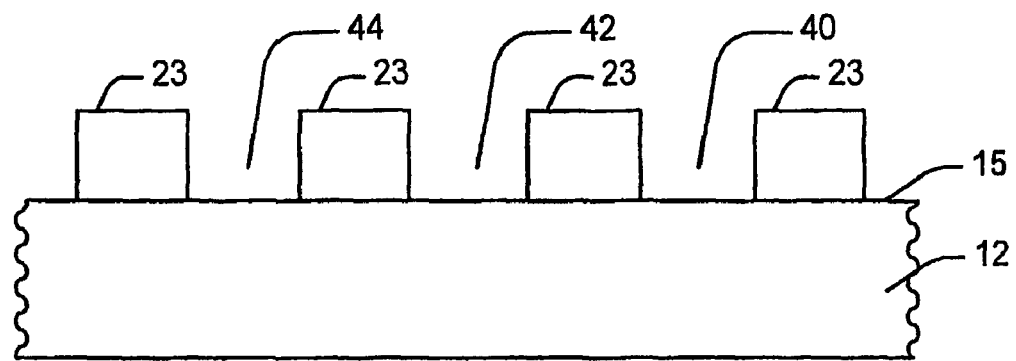
FIGS. 3A-3D depict views of the interior surface of the screen during formation of the luminescent screen assembly.

The light-absorbing matrix 23 is uniformly provided over the interior viewing surface 15 of the screen 12. Rectangular openings are formed between in the light-absorbing matrix 23 and typically have dimensions of about 0.7 mm². Referring to FIG. 3A, the light-absorbing matrix 23 defines three sets of fields: a green set of fields 40, a blue set of fields 42 and a red set of fields 44.

Figure 3B:
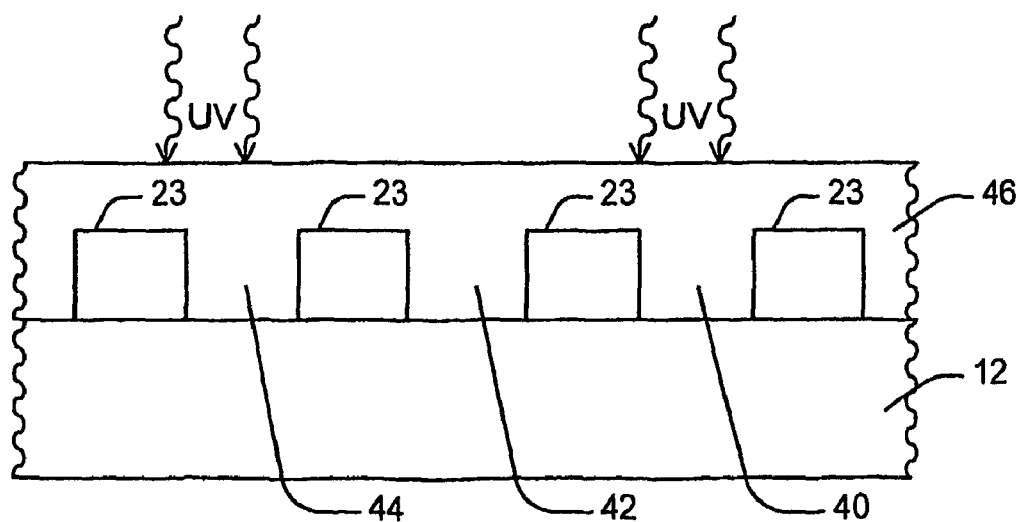

As indicated by reference numeral 304 in FIG. 2, at least one color phosphor (e.g., green, blue, red) is formed in one or more of the three sets of fields defined by the light-absorbing matrix 23. Referring to FIG. 3B, the at least one color phosphor may be formed by first depositing a photosensitive layer 46 on interior surfaces 15 of the screen 10. The photosensitive material layer 46 may comprise, for example, an aqueous solution of sodium dichromate and a polymer such as polyvinyl alcohol (PVA). The photosensitive material layer 46 may be formed on the screen 10 by spin coating the aqueous solution of the polymer and dichromate thereon. The thickness for the photosensitive material layer 46 should be within a range of about 0.5 micrometers to about 2.0 micrometers.

The photosensitive material layer 46 should have a viscosity within a range of about 10 centipoise (cps) to about 25 cps. The photosensitive material layer 46 may include sodium dichromate within a range of about 6 weight % to about 12 weight % and the polymer (e.g., PVA) within a range of about 88 weight % to about 94 weight %.

After the photosensitive material layer 46 is deposited on interior surfaces of the faceplate panel 12, portions of the photosensitive material layer 46 may be irradiated using, for example, actinic radiation to cross-link the photosensitive material of the photosensitive material layer 46 in the first and second sets of fields 40, 42. Cross-linking the photosensitive material in the photosensitive material layer 46 in the first and second sets of fields 40, 42 hardens the photosensitive material in such fields.

Figure 3C:
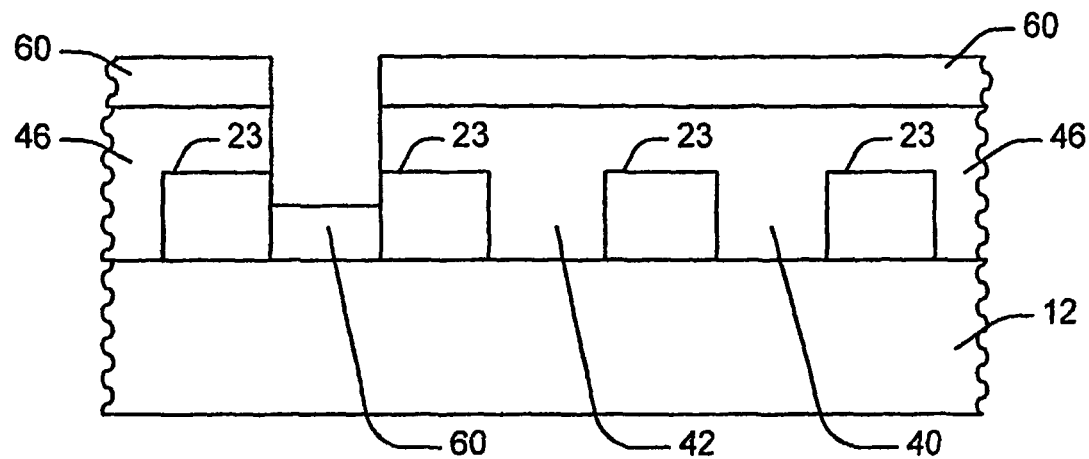

Referring to FIG. 3C, the unhardened portions of the irradiated photosensitive material layer 46 in the third set of fields 44 are developed using, for example, deionized water. During development, the unhardened portions of the photosensitive material layer 46 in the third set of fields 44 are removed.

After the unhardened portions of the irradiated photosensitive material layer 46 are removed, a first color phosphor layer 60 is applied over the interior surface 15 of the screen 10 in the third set of fields 44 and over the hardened photosensitive material in the first and second fields 40, 42. The first color phosphor layer 60 may be one of ZnS:Cu, Al (green phosphor), ZnS:Ag,Cl (blue phosphor) and $Y_2O_2S:Eu^{+3}$ (red phosphor).

Figure 3D:
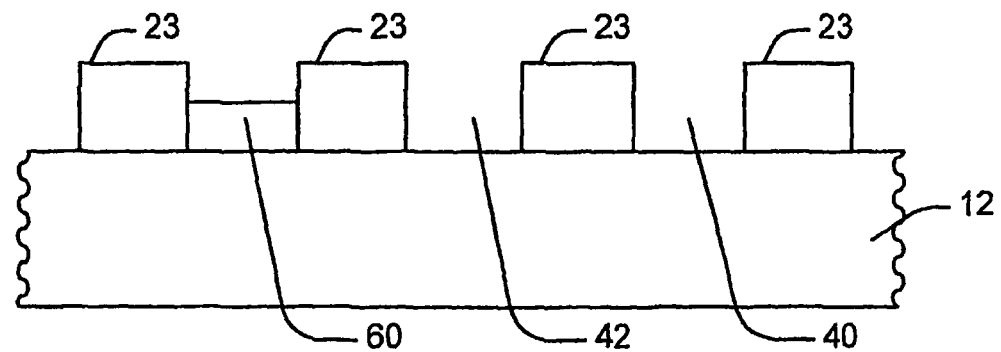

After the first color phosphor layer 60 is applied over the interior surface 15 of the screen 10, the screen 10 is heated. The screen 10 may be heated to a temperature of about 50° C. to about 100° C. and then cooled to a temperature of about 40° C. Thereafter, as shown in FIG. 3D, the hardened photosensitive material with the color phosphor layer 60 thereon is removed.

The first color phosphor layer formation process described above with reference to FIGS. 3A-3D, may then be repeated to form a second color phosphor in the second set of fields 42 or a third color phosphor in the first set of fields 40.

Although an exemplary luminescent screen for a carbon nanotube (CNT)/field emission display (FED) which incorporates the teachings of the present invention has been shown and described in detail herein, those skilled in the art can readily devise many other varied embodiments that still incorporate these teachings.

The invention claimed is:

1. A display, comprising:
   a screen having a patterned light-absorbing matrix thereon defining a plurality of sets of fields; and
   a three-color phosphor system disposed in the plurality of sets of fields, wherein the average particle size of phosphor material in the three-color phosphor system is about 3-4 microns.

2. The display of claim 1 wherein one phosphor of the three-color phosphor system is ZnS:Cu, Al.

3. The display of claim 1 wherein one phosphor of the three-color phosphor system is ZnS:Ag,Cl.

4. The display of claim 1 wherein one phosphor of the three-color phosphor system is $Y_2O_2S:Eu^{+3}$.

5. The display of claim 1 wherein the display is operated between about 4-10 kV.

6. A luminescent screen assembly of a carbon nanotube/field emission device display, comprising:
   a screen having a patterned light-absorbing matrix thereon defining a plurality of sets of fields; and
   a three-color phosphor system disposed in the plurality of sets of fields, wherein the average particle size of phosphor material in the three-color phosphor system is about 3-4 microns.

7. The luminescent screen assembly of claim 6 wherein one phosphor of the three-color phosphor system is ZnS:Cu, Al.

8. The luminescent screen assembly of claim 6 wherein one phosphor of the three-color phosphor system is ZnS:Ag,Cl.

9. The luminescent screen assembly of claim 6 wherein one phosphor of the three-color phosphor system is $Y_2O_2S:Eu^{+3}$.

10. The luminescent screen assembly of claim 6 wherein the display is operated between about 4-10 kV.

* * * * *